Sept. 17, 1957    S. A. ANDERSEN    2,806,540
BEET LIFTING AND TOPPING MACHINE
Filed Aug. 15, 1956    3 Sheets-Sheet 2
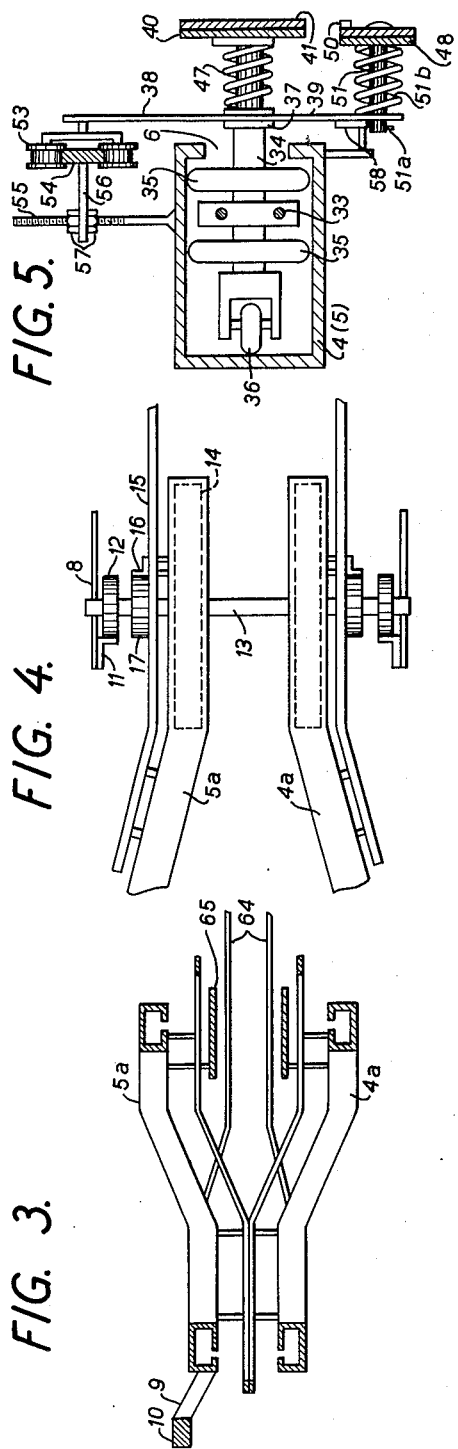
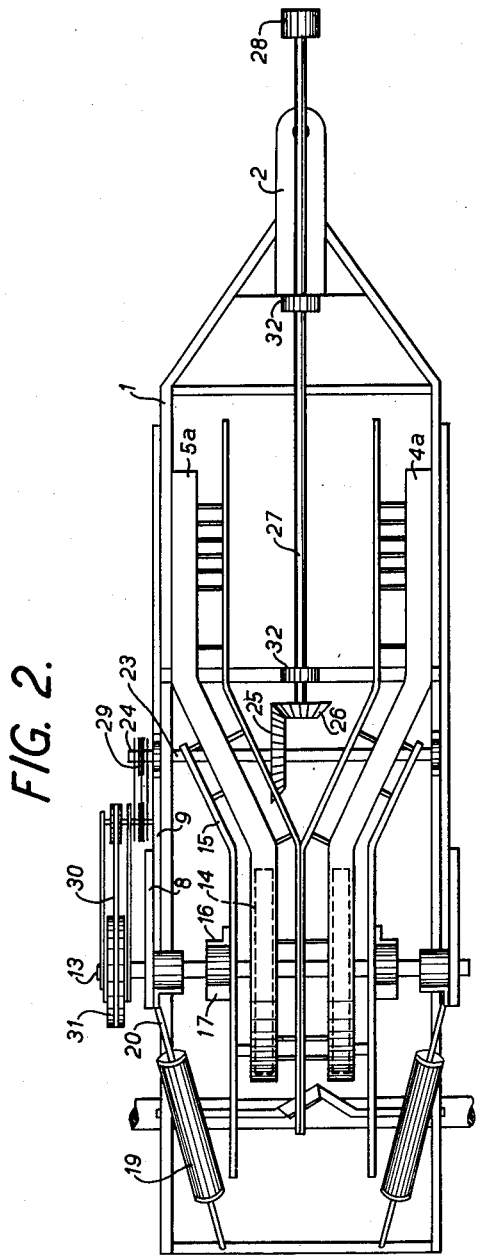
INVENTOR.
Svend Aage Andersen
BY W. Lee Helms Sept. 17, 1957     S. A. ANDERSEN     2,806,540
BEET LIFTING AND TOPPING MACHINE
Filed Aug. 15, 1956     3 Sheets-Sheet 3
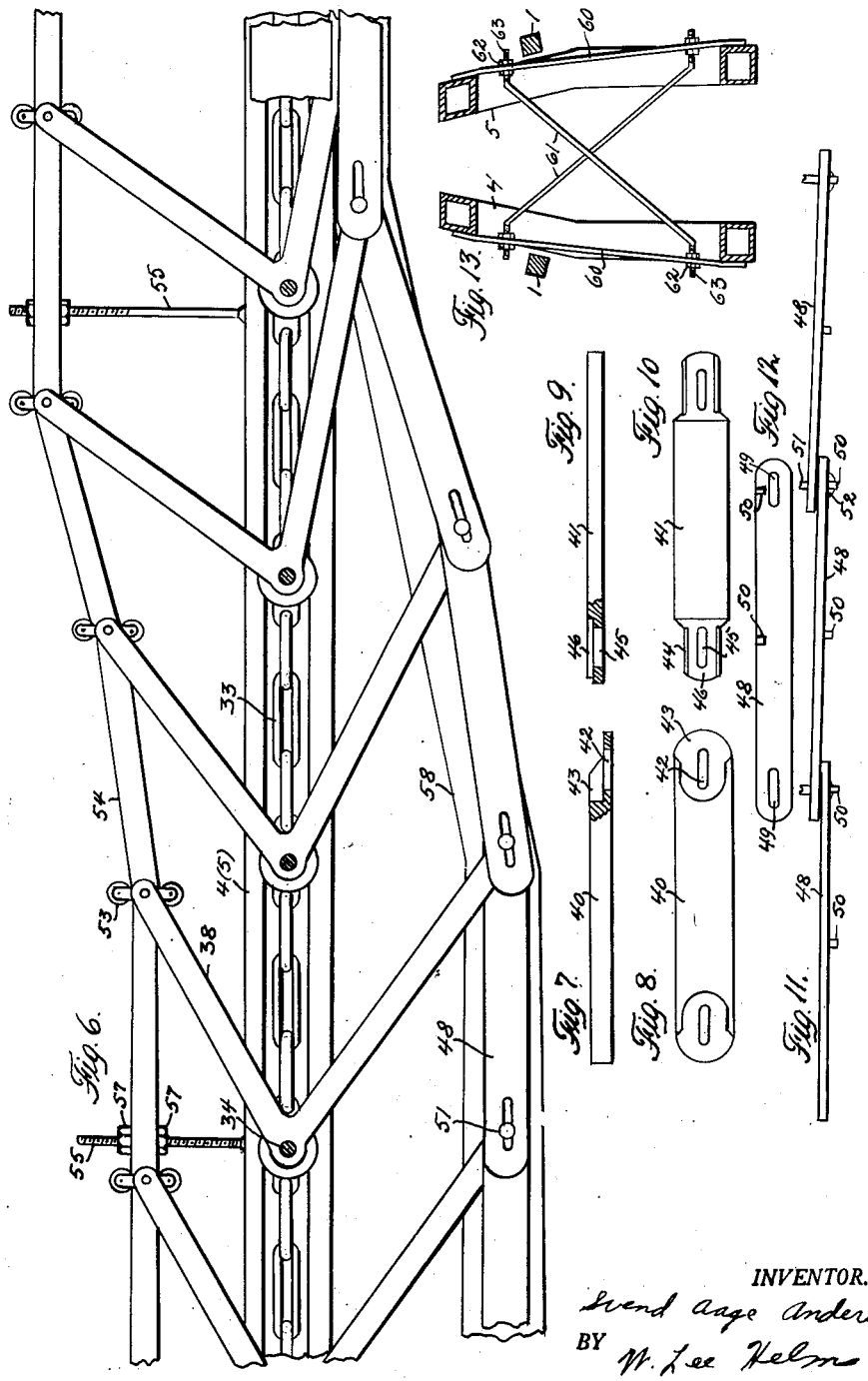
INVENTOR.
Svend Aage Anderson
BY W. Lee Helm

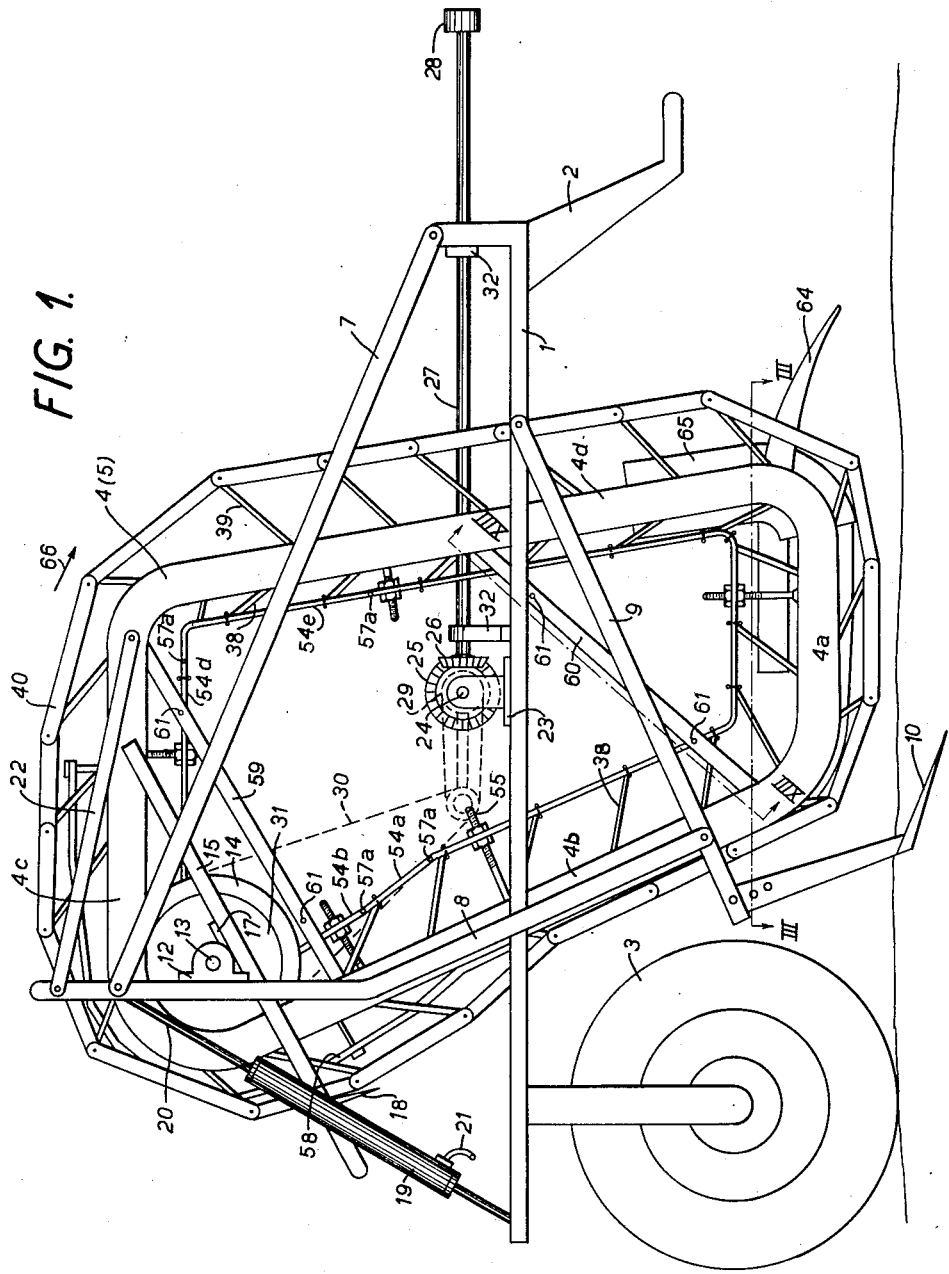

United States Patent Office 2,806,540
Patented Sept. 17, 1957

2,806,540

BEET LIFTING AND TOPPING MACHINE

Svend Aage Andersen, Stenstrup, Denmark

Application August 15, 1956, Serial No. 604,275

9 Claims. (Cl. 171—56)

The present invention relates to a beet lifting and topping machine of the type consisting of a frame, two vertically disposed closed tracks within said frame, slidable along each track, an endless conveyer belt comprising a series of spring actuated links slidably attached to pivot members guided in the track, the two belts being arranged for coaction as resilient gripping members for beet tops, means for driving the two said conveyer belts simultaneously in the same direction along said tracks, a beet lifting member attached to at least one of the tracks, a top cutting member attached to at least one of the tracks above the said lifting member, and means for adjusting the position of the beet in relation to the top cutting member.

The gripping of the beet top between the conveyer belts and the height adjusting chains in hitherto known beet lifting and topping machines of the above described type has proved unsatisfactory. The reason of this lies in the fact that the links of the two conveyer belts and the links of the two height adjusting chains, when gripping a beet top, are resiliently displaced laterally the same distance apart because they rigidly are mounted upon the same members by means of which the belts and the chains are driven through the machine. A consequence of this equal lateral spacing of the links of the two belts and the links of the two chains is that a beet top of considerable fullness will be clamped so tightly between the belts and the chains that it is difficult to obtain a proper outward displacement of the height adjusting chain links, and the slicing of the beet during the topping operation will become irregular. Another disadvantage of the hitherto known machines of the said type is that the links of the conveyer belt and the links of the height adjusted chain in each track are controlled by means of the same spring which is subjected to a double actuation, being partly compressed and partly twisted, which results in a rapid weakening of the springs. Another disadvantage of the machine is that an alteration of the pressure between the links of the two known types of these belts and the links of the two chains requires a considerable amount of work, because the tension of each spring has to be adjusted separately.

The main object of the beet lifting and topping machine according to the invention is to provide means remedying the above drawbacks in order to obtain a uniform topping irrespective of the type of root product being treated.

A further object of the invention is to provide means for arranging the links of the conveyer belts and the links of the height adjusting chain for resilient displacement independently of each other.

Another object of the invention is to provide links in the conveyer belts so constructed that a smooth and substantially closed surface throughout the entire length of the belt is obtained without reducing the pliability of the chain.

Yet another object of the invention is to provide links in the height adjusting chain which render possible the assembly of the chain by means of uniform link members.

It is likewise an object of the invention to provide links in the height adjusting chains with lugs by means of which a secure grip on the top is obtained without preventing the links from sliding along the beet top.

Fig. 1 shows in side elevation the machine constructed for trailing after a tractor, Fig. 2 is a top elevation of the machine shown in Fig. 1, Fig. 3 is a section on line III—III in Fig. 1, Fig. 4 shows on an increased scale the connection between the sprockets and the machine frame.

Fig. 5 is a section through an arbitrary part of a track with a transport belt and a height adjusting chain, Fig. 6 shows on an increased scale a part of a track seen towards its slotted side showing the traction chain and the height adjusting chain, the transport belt being removed, Figs. 7 and 8 show one of the links of the transport belt viewed from the edge and the outwardly turned surface respectively, Figs. 9 and 10 show a transport belt link to be interposed between two links as shown in Figs. 7 and 8, and viewed from the edge and the outwardly surface respectively, Fig. 11 shows in part three assembled links of the height adjusting chain viewed from the edge, Fig. 12 one of the links shown in Fig. 11 viewed from the outwardly turned surface, and Fig. 13 is a section on line XIII—XIII in Fig. 1 showing details only of the means for adjustment of the tracks in relation to each other.

In order to avoid confusion, details such as springs, division of links in the transport belt and height adjusting chain in Figs. 2, 3, and 4, and parts not necessary in order to understand the figure, e. g. in Fig. 13, are omitted.

The machine illustrated in the drawing comprises a horizontal substantially rectangular main frame 1 which forwardly is provided with a coupling member 2, by means of which the frame may be detachably coupled behind a tractor (not shown). To the rear end of the frame 1 is mounted a pair of supporting wheels 3.

Parallel to and within each of the main frame are arranged two vertical closed tracks 4 and 5. These two tracks are congruent, and as shown in Fig. 5 have each rectangular cross section, the sides of the tracks facing each other being provided with a slot 6 extending throughout the entire length of the tracks. The lower ends 4a and 5a of the two tracks are substantially horizontal, and from their foremost relatively spaced parts the two tracks converge rearwardly, see Fig. 3, and curve upwardly as parallel parts 4b with a rearward incline of approximately 60–70°. The uppermost parts 4c and 5c of the two tracks proceed forwardly substantially horizontal and diverge a short distance and thereupon curve downwardly as relative parallel parts 4d and 5d which continue into the aforesaid lower parts 4a and 5a respectively.

To each side of the front end of frame 1 is rotatably attached by its one end a rearwardly extending stay rod 7, the rear end of which is rotatably attached to the upper part of a substantially vertical supporting bar 8. The lower end of this supporting bar 8 is attached to the rear end of a guide rod 9, the foremost end of which is rotatably attached to the frame side. The guide rod 9 on one side of the frame carries on an extension of its rear end a beet loosening member 10, the shaft of which is provided with holes for varying the height of the loosening member in relation to the soil surface.

Each supporting bar 8 carries a bearing 12 attached to the bar, for instance by means of an angle piece 11 as shown in Figs. 2 and 4. In these bearings is journalled a driving shaft 13 to which is attached two sprockets 14 each entering the upper part of one of the tracks 4 and 5 which for this purpose is provided with an opening in the curved portion between track part 4b or 5b and track part 4c or 5c. To the outer side of each track 4 and 5 there is rigidly attached a downwardly and rearwardly inclined bar 15, and by means of an angle piece 16 a bearing 17 is attached to the bar 15 in such a position that it serves as journal for the aforesaid driving shaft 13. Each bar 15 is extended rearwardly, and between the rear ends of the extensions carries a topping knife 18 positioned midways between the two track parts 4b and 5b. Between the rear end of the main frame 1 and the upper end of each supporting rod 8 there are inserted two relatively spaced hydraulic pumps 19, the pistons 20 of which are attached to the supporting rod 8. These hydraulic pumps are by means of tubing 21 connected to the hydraulic system of the tractor (not shown) behind which the machine is coupled. When the hydraulic pump pistons are displaced outwardly they will lift the supporting rods 8, and on account of the connection between these supporting rods with the tracks through bearings 12 and 17 and driving shaft 13, the tracks 4 and 5 together with the beet lifting member 10 will be raised in relation to the main frame 1. A stay bar 22 is by its one end attached to the extreme upper end of each supporting bar 8, the other end of the bar 22 being provided with a row of holes for its attachment in a desired position to the track 4 or 5.

For operation of the sprockets 14 the main frame 1 is provided with bearings 23 for a transverse shaft 24 to which is attached a bevel gear 25 engaging a pinion 26 on the rear end of a transmission shaft 27. This shaft 27 is provided with a coupling device 28 by means of which the shaft may be operatively connected to the output shaft of the tractor to which the machine is coupled. Further, the shaft 27 carries a pulley or a sprocket 29 which by means of an expandable belt or a chain 30 is connected to another and larger pulley or sprocket 31 attached to the driving shaft 13. Thus the two sprockets 14 are rotated by means of the tractor output through the bevel gearing 25, 26 and the belt or the chain drive 29—31. The transmission shaft 27 is journalled in bearings 32 on the main shaft 1.

The object of the sprockets 14 is to drive an endless chain 33 disposed in each of the tracks 4 and 5, see Fig. 6. A number of the links of this chain 33, e. g. as shown every fourth link, is attached to a spindle 34 which in known manner is guided within the track so that the spindle has some freedom of movement in any sideway direction. For this purpose each spindle is provided with rollers 35 having rounded edges and running along the side walls of the track, and a thrust roller 36 likewise with rounded edge, running along the base of the track. The guiding rods 34 project through the slots 6 in the opposed walls of the tracks, and outside the track each rod is provided with a collar 37 serving as abutment for a bell crank lever rotatably mounted on the guiding rod, the arms of which lever are indicated by the numerals 38 and 39 respectively. The object of this bell crank lever is explained later on in the specification. To the free end of these guiding rods 34 an endless transport chain is attached. This transport chain consists of plurality of flat links 40, see Figs. 7 and 8, interconnected by means of other flat and slightly thinner links 41, Figs. 9 and 10. Each link 40 has within each end an elongated hole 42 and in the one surface a recess 43 encompassing each elongated hole 42 and open towards the same end of the link. The ends 44 of each link 41 is narrowed a length corresponding substantially to the length of the recess 43 of link 40, and a width slightly less than the width of the said recess. Each narrowed end 44 of link 41 is provided with an elongated hole 45, and in the one surface of the link there is a recess 46 extending throughout the entire length of each narrow link end 44. The links 40 and 41 are interconnected alternately to form an endless chain by means of the guiding rods 34, which are carried through holes 42 and 45. The narrow ends of links 41 engage the recesses 43 in links 40, and the recessed surfaces of links 40 and 41 are turned away from the track in which the guiding pin is guided. The links are each prevented from being removed from the guiding rods by means of a washer and a cotter pin (not visible in the drawing) which lies in the recess 46 of each link 41. Between the ends of links 40 and the bell crank lever 38, 39 the spindle 34 carries a coil spring 47 by means of which the links 40 and 41 are held resiliently spaced from the lever. The outwardly turned surfaces of the links form a substantially even surface broken only by the small openings between links 40 and 41.

The downwardly extending arms 39 in Fig. 6 of the bell crank levers serve as carriers for an endless chain by means of which the position of the beet engaged by the transport belt is adjusted in relation to the cutter member 18, and which hereinafter is called the height adjusting chain. This chain consists of a plurality of flat link members 48, Figs. 11 and 12, which are all alike. Each link has within each end an elongated hole 49, and on its one flat surface adjacent the one edge it has two lugs 50, one opposite the middle of the one elongated hole 49, the other midway between the link ends. As shown in Fig. 12 these links 48 are interconnected in such a manner that the end of each link having no lug lies behind the end of the next link 48 in the chain provided with a lug 50, all the lugs turned away from the track in which the bell crank lever is guided. The links 48 are interconnected by means of a pin 51 provided with a flat rounded head 52. As shown in Fig. 5 the pin 51 is slidable longitudinally in a smooth hole in the end of the lever arm 39 and prevented from sliding out of the hole by means of a cotter pin 51a. Between the links 48 and each lever arm 39 is inserted a coil spring 51b which is somewhat weaker than coil springs 47 between the lever and the transport belt links, and which serves to hold the links 48 of the height adjusting chain resiliently outwards.

The upwardly extending arms 38 of the bell crank levers serve as guiding members for the height adjusting chain, and each carries on its free end a runner 53 engaging a guide rail 54, see Fig. 6. This guide rail 54 is attached to the track along which the height adjusting chain is guided, by means of threaded spindles 55. As shown in Fig. 5 the guide rail 54 for each spindle a laterally projecting arm 56 provided with a smooth hole for the spindle 55, and by means of nuts screwed on the spindle on either side of the arm 56 the position of the guide rail in relation to the track 4 or 5, to which the spindle is attached, may be adjusted.

As shown in Fig. 1 each guide rail 54 is adjusted in such a manner in relation to its track 4 or 5 that along the lower end of the upwardly and rearwardly inclined track part 4b or 5b the height adjusting chain is drawn close up to the transport belt from which position it is gradually displaced away from the transport belt until its outer edge is almost level with the cutting edge of the topping knife 18.

In order to render possible this adjustment of the guiding rail 54 the part of the rail extending alongside the upper portion of the track part 4b or 5b and the top part 4c or 5c of the track, is composed of rail sections 54a, 54b . . . 54e, which are connected to each other and to the main part of the rail by means of clamp screws 57. Upon loosening these clamp screws 57 and the nuts 57 on the spindles 55 supporting the rail sections, it is possible to adjust the sectioned parts of the guide rail nearer to or farther from the track, and consequently ensuring a corresponding adjustment of the height adjusting chain, whereupon the clamp screws 57 and nuts 55 are again tightened.

Between each tracks 4 or 5 and the height adjusting chain guided by the track there is arranged a supporting rail 58, see Figs. 5 and 6. This rail extends mainly along the part of the track where the aforesaid displacement of the height adjusting chain takes place, and its object is to prevent tilting of the links of the height adjusting chain and beet engaged thereby while the beet are conveyed to the topping knife 18 and during the topping process.

Each of the two tracks 4 and 5 is provided with an upper and a lower stay 59 and 60 respectively, see Figs. 1 and 13, traversing each track from side to side and rigidly attached thereto. The stays 60 of the two tracks are interconnected by means of two stay rods 61, Fig. 13, each connecting the one end of one transverse stay with the opposite end of the other transverse stay. Each transverse stay 60 is provided with smooth holes engaging the ends 63 of the stay rods 61. The said stay rod ends 63 are each angularly bent so as to pass perpendicularly through the holes in the transverse stays, and each thus bent end is threaded for two nuts 62, one on either side of the transverse stay 60. A corresponding connection is provided between the transverse stays 59. By loosening all the nuts 62 it is possible to move the tracks nearer to or farther from each other, and thus increase or decrease the pressure between the coacting transport belts of the two tracks in accordance with the type of root product to be treated.

As shown in Figs. 1 and 3 there is arranged between the lower ends of track 4 and 5 two formerly extending leaf-lifters 64, which rearwardly are attached to the tracks. Between these leaflifters and the foremost part of the tracks there are inserted screens 65 to prevent the beet leaves from becoming entangled in the foremost parts of the rearwardly moving transport belts.

When coupled behind a tractor and after lowering the tracks 4 and 5 by means of the hydraulic pumps 19 to operating position, the machine is drawn by means of the tractor along a row of beets in such a manner that the beet row lies centrally in relation to the machine. By means of the transmission shaft 27, which is connected to the output shaft of the tractor, the sprockets are rotated to move the transport belt and height adjusting chain in the direction indicated by arrow 66 in Fig. 1, i. e. opposite the direction of drive, and at approximately the same speed as the speed of drive of the machine. The top lifters raise the beet leaves which are thereupon clamped between the converging transport belts and height adjusting chains and held by these belts while the beet is loosened by means of the loosening member 10, whereupon the beet is lifted out of the soil when the transport belts enter the curved transitions to the upwardly inclined parts 4b and 5b of the tracks. When the lever arms 38 reach the curved parts of the guide rails 54 commencing with part 54a, see Figs. 1 and 6, the links of the height adjusting chains will be gradually displaced away from the transport belts, until they press against the upper surface of the beet root. Owing to the fact that the pressure imparted to the transport belt links by means of springs 47 is greater than the pressure imparted to the links of the height adjusting chain links by means of springs 51b, the links of the height adjusting chains will adjust themselves to the protrusion of the beet top and can slide along the beet leaves until contacting the upper end of the beet root. The lugs 50 projecting from the links of the height adjusting chain are arranged in such a manner that they serve to grip the leaves of the beet without preventing the links from sliding along these leaves. Instead of the two lugs on each link as shown, there may be additional lugs arranged relatively spaced. The continued pressure of the height adjusting chains upon the beet root during displacement will cause the beet leaves to slide between the relatively smooth transport belts as long as displacement by means of the guiding rail 54 of the height adjusting chains takes place. This height adjustment is so adapted that the beet root is displaced to a position in which the topping knife 18 will sever the top from the root with a slice of the root of a predetermined thickness. The thus severed root will drop to the ground, while the remaining top with its top slice is transported to the upper end of the machine where it is released at the point where the divergence of the tracks commences, and drop to the ground.

During their passage along the upwardly inclined parts 4b and 5b of the tracks the height adjusting chain links are supported by means of the supporting rails 58 to avoid tilting of the beet engaged by the belts and chains, thus ensuring a correct severing of the top from the beet root.

I declare that what I claim is:

1. A beet lifting and topping machine of the type consisting of a frame, two vertically disposed closed tracks within said frame, slidable along each said track an endless conveyor belt comprising a series of spring actuated links slidably attached to pivot members guided in the track, the two belts being arranged for coaction as resilient gripping members for beet tops, means for driving the two said conveyer belts simultaneously in the same direction along said tracks, a beet lifting member attached to at least one of the tracks, a top cutting member attached to at least one of the tracks above the said lifting member, and means for adjusting the position of the beet in relation to the top cutting member, in which the position adjusting means comprise two chains of links interconnected by means of pivot members, rigid carrier members rotatably attached to the pivot members of the conveyer belt links and to the pivot members of the position adjusting chain links for the same track, a guide rail attached to each of the tracks and somewhat spaced therefrom, means slidably connected to each of the said guide rails and attached to the said carrier members, means for resilient displacement of the pivots of the position adjusting chain links in the said carrier members, and means for adjusting the shape of the said guide rail to guide the links of the height adjusting chains a predetermined distance away from the conveyer belt in the vicinity of the top cutting member.

2. A beet lifting and topping machine as claimed in claim 1, in which the means connecting the position adjusting chain links to the conveyer chain links and the guide rails comprise bell crank levers each fulcrumed on a conveyer belt link pivot, a runner rotatably attached to the end of the one arm of each lever and engaging the said guide rail, and a pivot pin slidable in the end of the other arm of each lever and projecting laterally therefrom to serve as link connection for the height adjusting chain.

3. A beet lifting machine as claimed in claim 1, in which each carrier member connecting the position adjusting chain links to the conveyer belt links and the guide rails comprises a bell crank lever rotatable but nonslidable on a conveyer belt link pivot, a runner coacting with the said guide rail rotatable on the end of the one arm of each lever, a pin slidable in and projecting laterally from the end of the other arm of each lever to serve as pivot for the height adjusting chain links, a coil spring mounted on each said pivot and interposed between the conveyer belt links and the bell crank lever, and another but weaker coil spring mounted on each pivot pin and interposed between the height adjusting chain links and the bell crank lever arm supporting this chain.

4. A beet lifting machine as claimed in claim 1, in which the links of the conveyer chain are subjected to outward pressure by means of a spring, and the links of the position adjusting chain is subjected to outward pressure by means of a separate spring weaker than the first mentioned spring, and each link of the position adjusting chain is provided on its outward side along one half of its length with at least two interspaced lugs.

5. A beet lifting and topping machine of the type consisting of a frame, two vertically disposed closed tracks within said frame, slidable along each said track an endless conveyer belt comprising a series of spring actuated links slidably attached to pivot members guided in the track, the two belts being arranged for coaction as resilient gripping members for beet tops, means for driving the two said conveyer belts simultaneously in the same direction along said tracks, a beet lifting member attached to at least the one of the tracks, a topping knife attached to at least the one track above the lifting member, and means for adjusting the position of the beet in relation to the top cutting member, in which the conveyer belt consists alternately of flat elongated links provided at each end with an elongated hole and around the hole on the one side a recess, and thinner flat link members having at each end a narrow portion adapted to engage the recess in the first mentioned link members and having in the narrowed portions elongated holes and in the one side a recess, a plurality of spindles guided within and projecting from the tracks, a chain within each track interconnecting the said spindles, sprockets for driving the said chains in the two tracks, power means for rotating the sprockets, a guide rail attached to and extending along each track, a bell crank lever rotatably but nonslidably mounted on each spindle end projecting from the tracks between the track and the link members forming the conveyer belt, a runner attached to the end of the one arm of each lever coacting with the said guide rail, a laterally projecting pin slidable within a hole in the end of the other arm of each said lever, a plurality of flat link members with elongated holes at each end mounted on said laterally projecting pins to form an endless chain for adjusting the position of the beet in relation to the topping knife, and means interconnecting the tracks adjustably in relation to each other.

6. A beet lifting and topping machine as claimed in claim 5, in which the two tracks comprise lower substantially horizontal parts converging rearwardly and curving into upwardly extending steeply inclined parts, upper substantially horizontal parts diverging forwardly and curving downwards to join the forward ends of the said lower track parts.

7. A beet lifting and topping machine as claimed in claim 5, in which each guide rail consists of a rail portion attached to a track, and a rail portion assembled of a number of rail sections linked together by means of clamp screws, a plurality of laterally projecting arms attached to the rail portions and provided with smooth holes, a threaded spindle rigidly attached to the tracks for insertion through the hole in each said arm, and clamp nuts screwed on the said spindles at either side of the said arm.

8. A beet lifting and topping machine as claimed in claim 5, in which the means for adjustably interconnecting the tracks consist of at least two transverse stays attached to each track and provided with smooth holes, at least two rods interconnecting the stays of the one track with the stays of the other track, each rod having angularly bent threaded ends for insertion into the said smooth holes of the stays, and nuts for clamping the rods to the said stays.

9. A beet lifting and topping machine as claimed in claim 5, in which each track carries a supporting rail extending along at least the part of the track where displacement of the position adjusting chain takes place, and means for rigidly attaching the rail to the track in a position to abut the outer side of carrier members of the position adjusting chain.

References Cited in the file of this patent
UNITED STATES PATENTS

| | | |
|---|---|---|
| 1,194,189 | Kincaid | Aug. 8, 1916 |
| 1,207,889 | Fletcher | Dec. 12, 1916 |
| 1,504,484 | Knowles | Aug. 12, 1924 |
| 1,559,501 | Burdick | Oct. 27, 1925 |